US011061495B2

(12) United States Patent
Chou

(10) Patent No.: US 11,061,495 B2
(45) Date of Patent: Jul. 13, 2021

(54) MOUSE PAD STRUCTURE HAVING WIRELESS CHARGING COIL AND MANUFACTURING PROCEDURE THEREOF

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 262 days.

(21) Appl. No.: 16/281,024

(22) Filed: Feb. 20, 2019

(65) Prior Publication Data

US 2020/0225774 A1 Jul. 16, 2020

(30) Foreign Application Priority Data

Jan. 11, 2019 (TW) .................................. 108101207

(51) Int. Cl.
*G06F 3/039* (2013.01)
*H01F 38/14* (2006.01)
*H02J 7/02* (2016.01)

(52) U.S. Cl.
CPC .......... *G06F 3/0395* (2013.01); *H01F 38/14* (2013.01); *H02J 7/025* (2013.01)

(58) Field of Classification Search
CPC ........ G06F 3/0395; H02J 7/025; H01F 38/14
See application file for complete search history.

(56) References Cited

U.S. PATENT DOCUMENTS

| | | | |
|---|---|---|---|
| 9,898,110 B1* | 2/2018 | Chou | G06F 3/03543 |
| 10,622,828 B2* | 4/2020 | Chou | H01F 38/14 |
| 2007/0069097 A1* | 3/2007 | Hsieh | G06F 3/0395 |
| | | | 248/346.01 |
| 2020/0218369 A1* | 7/2020 | Chou | G06F 3/03543 |
| 2020/0220374 A1* | 7/2020 | Chou | H02J 7/025 |

* cited by examiner

*Primary Examiner* — Richard V Muralidar
(74) *Attorney, Agent, or Firm* — Chun-Ming Shih; HDLS IPR Services

(57) ABSTRACT

A mouse pad structure having wireless charging coil and a manufacturing procedure thereof are provided. The mouse pad structure having wireless charging coil includes: a covering layer, formed with an injection molding means and having a seat member and plural accommodation slots; a first fabric layer, disposed on the seat member, and arranged on a lateral surface opposite to the accommodation slots; a coil layer having coils accommodated in the accommodation slots; and a silicone layer, filled in the accommodation slots for covering the coils. Accordingly, the mouse pad structure having wireless charging coil is assembled.

9 Claims, 4 Drawing Sheets

MOUSE PAD STRUCTURE HAVING WIRELESS CHARGING COIL AND MANUFACTURING PROCEDURE THEREOF

BACKGROUND OF THE INVENTION

Field of the Invention

The present invention relates to a mouse pad structure, especially to a mouse pad structure having wireless charging coil and a manufacturing procedure thereof.

Description of Related Art

A mouse pad is a necessary device for the computer periphery equipment, a mouse is able to be used for performing an accurate movement on the mouse pad, so that a cursor can be precisely driven to move, and a user can input various commands via the mouse.

Moreover, a wireless mouse can provide a tremendous operating convenience to a user, thus there is a combination of a mouse and a wireless charging mouse pad available in the markets. However, the conventional wireless charging mouse pad structure is provided with a wireless charging module stacked on the mouse pad, so that a charging surface would protrude out from a surface of the mouse pad which causes the surface of the mouse pad not being flat and smooth, and there may be an obstruction generated while the mouse is operated. As such, the above-mentioned disadvantages shall be improved.

Accordingly, the applicant of the present invention has devoted himself for improving the mentioned disadvantages.

SUMMARY OF THE INVENTION

The present invention is to provide a mouse pad structure having wireless charging coil and a manufacturing procedure thereof, in which coils are embedded in a covering layer and prevented from protruding out from a first fabric layer, so that a mouse pad structure having wireless charging coil can be assembled.

Accordingly, the present invention provides a mouse pad structure having wireless charging coil, which includes a covering layer, a first fabric layer, a coil layer and a silicone layer. The covering layer has a seat member and a plurality of accommodation slots formed on a lateral surface of the seat member; the first fabric layer is disposed on the seat member, and arranged on another lateral surface opposite to the accommodation slots; the coil layer has a plurality of coils accommodated in the accommodation slots; and the silicone layer is filled in the accommodation slots and served to cover the coils.

Accordingly, the present invention provides a manufacturing procedure of mouse pad structure having wireless charging coil, which includes: providing a covering layer, formed with a seat member with an injection molding means, wherein a plurality of accommodation slots are formed on a lateral surface of the seat member; providing a first fabric layer, disposed on the seat member, and arranged on another lateral surface opposite to the accommodation slots; providing a coil layer, including a plurality of coils accommodated in the accommodation slots; and providing a silicone layer, filled in the accommodation slots and served to cover the coils.

In comparison with related art, the present invention has advantageous features as follows. According to the mouse pad structure having wireless charging coil, the seat member having the plural accommodation slots is formed with the injection molding means, the first fabric layer is disposed on another lateral surface of the seat member, the coils are accommodated in the accommodation slots, and the silicone layer in a liquid status is filled in the accommodation slots then solidified for covering the coils; thus, the coils can be embedded in the silicone layer and prevented from protruding out from the first fabric layer, and advantages of enabling a surface of the mouse pad to be flat and enabling a mouse to be smoothly operated on the mouse pad are provided.

DETAILED DESCRIPTION OF THE INVENTION

One preferred embodiment of the present invention will be described with reference to the drawings.

Figure 1:
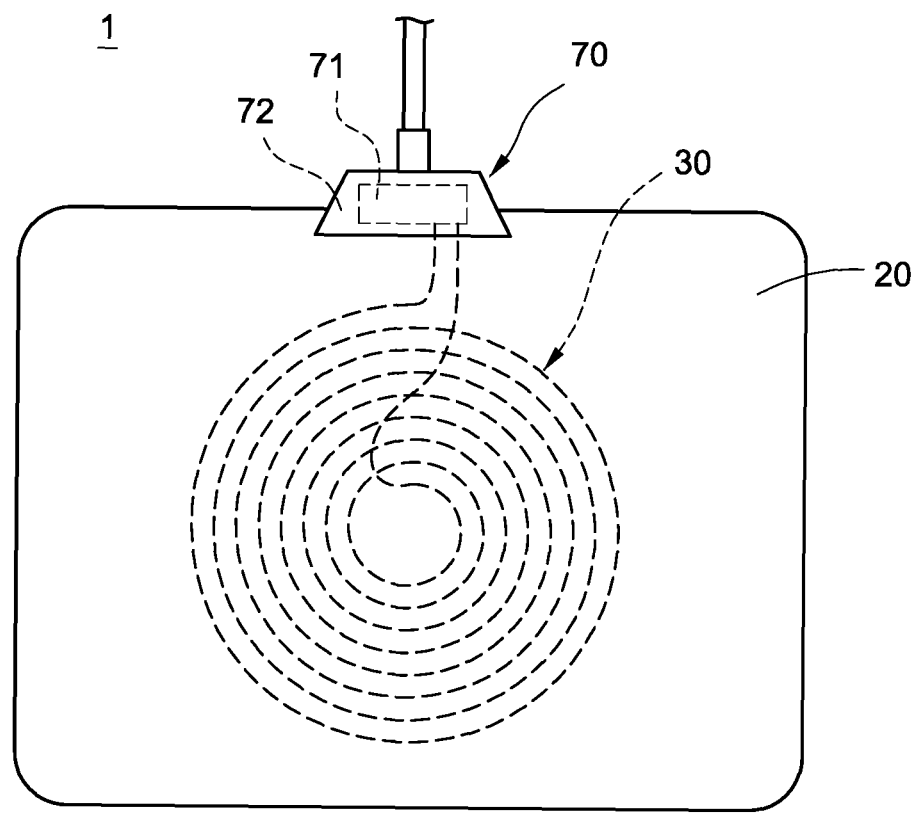
FIG. 1 is a top view showing a mouse pad structure having wireless charging coil according to one embodiment of the present invention.
Figure 2:
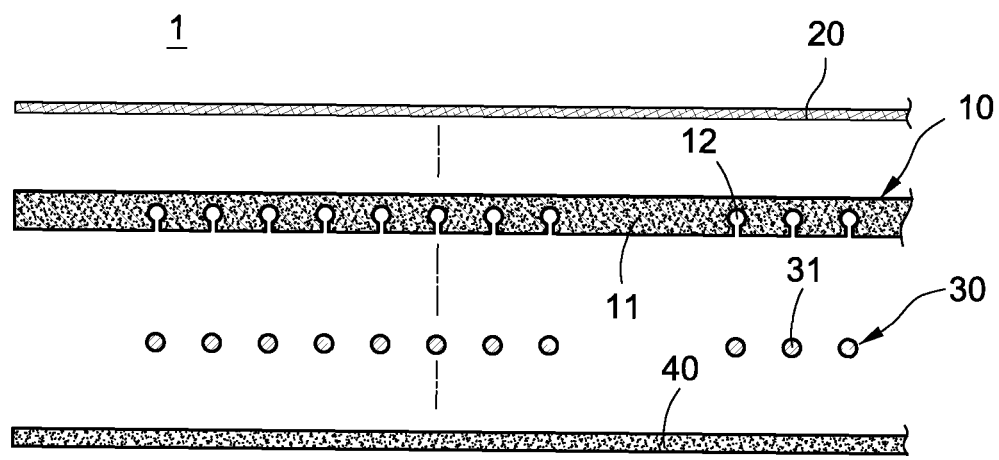
FIG. 2 is a cross sectional exploded view showing the mouse pad structure having wireless charging coil according to one embodiment of the present invention.

Please refer to FIG. 1 to FIG. 2, wherein FIG. 1 is a top view showing a mouse pad structure having wireless charging coil according to one embodiment of the present invention; and FIG. 2 is a cross sectional exploded view showing the mouse pad structure having wireless charging coil according to one embodiment of the present invention. The present invention provides a mouse pad structure having wireless charging coil 1 including a covering layer 10, a first fabric layer 20, a coil layer 30 and a silicone layer 40 sequentially arranged from bottom to top. Details for disclosing the mouse pad structure having wireless charging coil 1 are provided as follows.

The covering layer 10 is preferable to be made of silicone. The covering layer 10 is formed with an injection molding means and has a seat member 11 and a plurality of accommodation slots 12 formed on a lateral surface of the seat member 11. According to this embodiment, the plural accommodation slots 12 are formed in the seat member 11 with an injection molding means, and each of the accommodation slots 12 is formed as a U-shaped slot. The first fabric layer 20 is disposed on the covering layer 10, and arranged on another lateral surface opposite to the accommodation slots 12. According to this embodiment, the first fabric layer 20 is an operation fabric layer for allowing a mouse to be operated thereon; preferably, the first fabric layer 20 is a multi-spandex fabric.

The coil layer 30 has a plurality of coils 31 accommodated in the accommodation slots 12. The coil 31 is a wireless charging sense coil. Moreover, the silicone layer 40 is filled in the accommodation slots 12 for covering the coils 31.

As shown in FIG. 1, according to one embodiment of the present invention, the mouse pad structure having wireless charging coil 1 further includes a connection module 70. The connection module 70 has a circuit board 71 electrically connected to the coil layer 30 and a connector 72 allowing the circuit board 71 to be combined therein. The connector 72 is connected to an external power source for supply electric power to the circuit board 71 and the coil layer 30.

According to the prevent invention, the mouse pad structure having wireless charging coil 1 utilizes the above-mentioned structure for enabling the coil layer 30 to be embedded in the covering layer 10 and prevented from protruding out from the first fabric layer 20.

Figure 3:
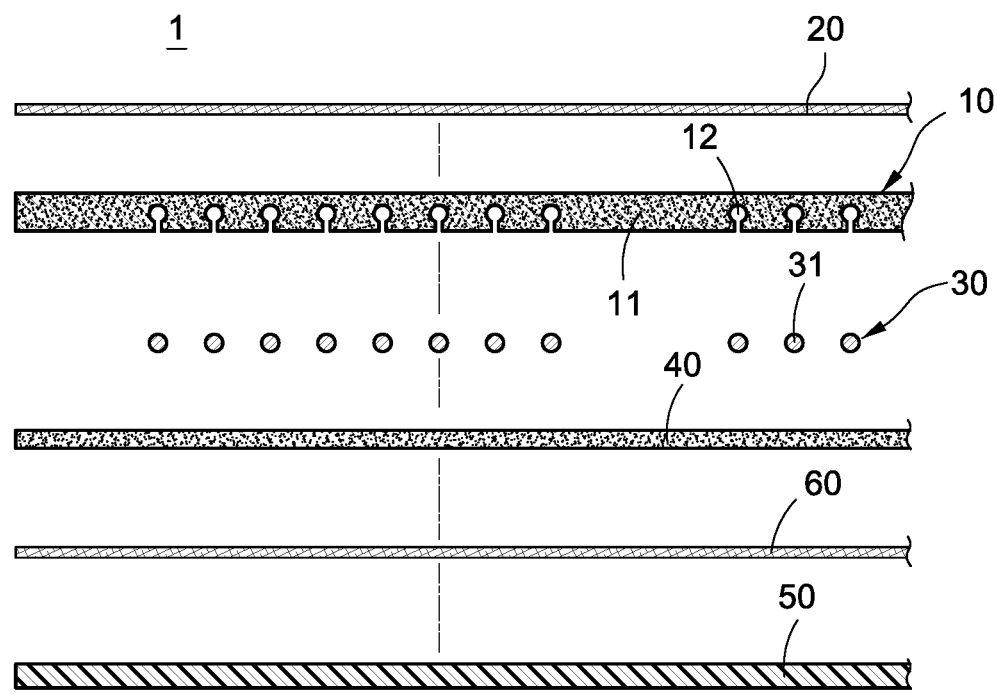
FIG. 3 is a cross sectional exploded view showing the mouse pad structure having wireless charging coil according to an alternative embodiment of the present invention.

Please refer to FIG. 3, which is a cross sectional exploded view showing the mouse pad structure having wireless charging coil according to an alternative embodiment of the present invention. According to one embodiment of the present invention, the mouse pad structure having wireless charging coil 1 further includes a base 50 and a second fabric layer 60 disposed on the base 50. The base 50 is disposed on the silicone layer 40 via the second fabric layer 60. Preferably, the base 50 is a base made of rubber.

Figure 4A:
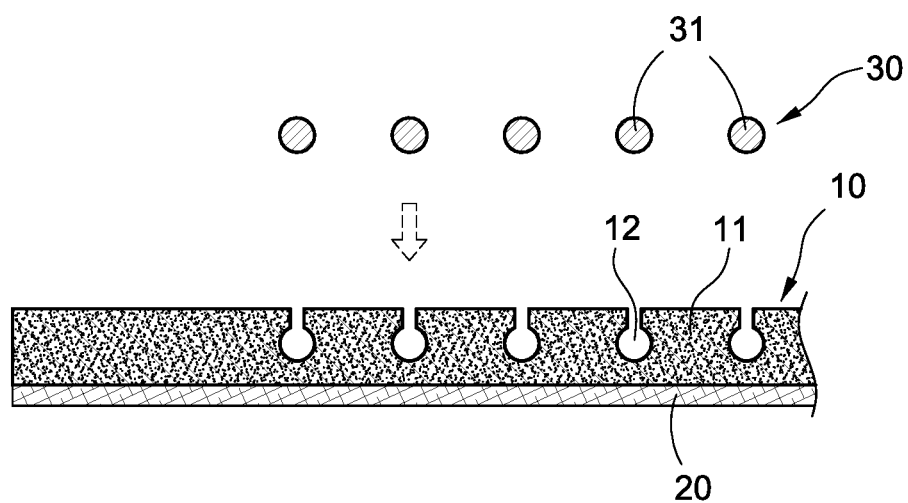
FIG. 4A is a schematic view showing a manufacturing procedure of mouse pad structure having wireless charging coil according to one embodiment of the present invention.
Figure 4B:
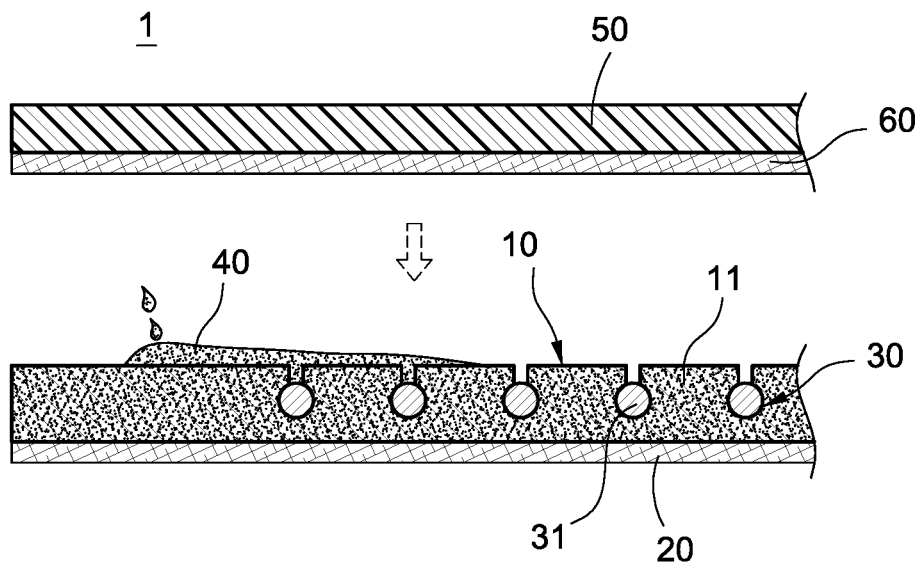
FIG. 4B is another schematic view showing the manufacturing procedure of mouse pad structure having wireless charging coil according to one embodiment of the present invention.
Figure 4C:
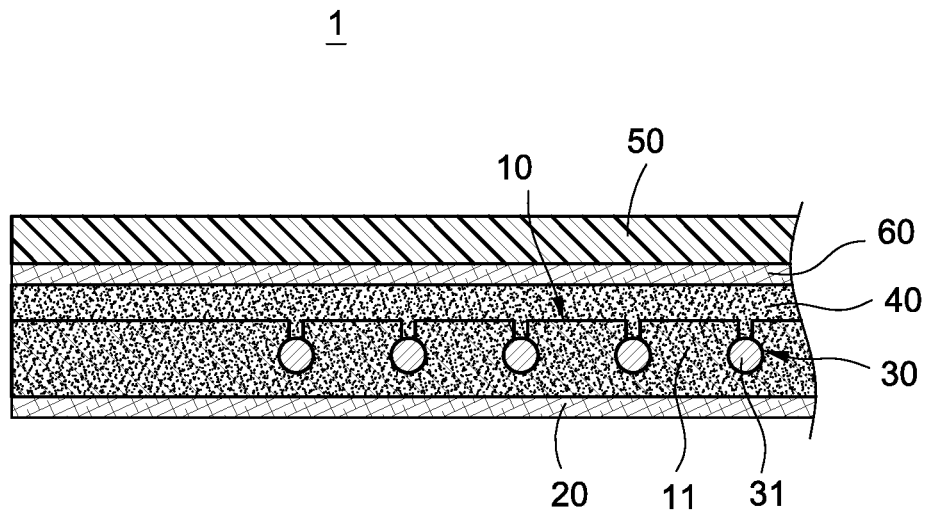
FIG. 4C is one another schematic view showing the manufacturing procedure of mouse pad structure having wireless charging coil according to one embodiment of the present invention.

Please refer to FIG. 4A, FIG. 4B and FIG. 4C, which are schematic views showing a manufacturing procedure of mouse pad structure having wireless charging coil according to one embodiment of the present invention. As shown in figures, the manufacturing procedure of mouse pad structure having wireless charging coil are disclosed as follows. Firstly, the covering layer 10 is provided, the seat member 11 is formed on the covering layer 10 with an injection molding means and a plurality of the accommodation slots 12 are formed on a lateral surface of the seat member 11; the first fabric layer 20 is provided, the first fabric layer 20 is disposed on the seat member 11 and arranged on another lateral surface opposite to the accommodation slots 12.

And then, the coil layer 30 is provided, the coil layer 30 has a plurality of the coils 31 accommodated in the accommodation slots 12. Lastly, the silicone layer 40 is provided, the silicone layer 40 is filled in the accommodation slots 12 of the covering layer 10 and served to cover the coils 31. Accordingly, the coil layer 30 can be embedded in the covering layer 10 and prevented from protruding out from the first fabric layer 20. What shall be addressed is that the silicone layer 40 filled in the accommodation slots 12 is in a liquid status, then the silicone layer 40 is solidified for covering the coils 31.

Moreover, the manufacturing procedure of the mouse pad structure having wireless charging coil further includes providing a base 50 and a second fabric layer 60 disposed on the base 50. The base 50 is disposed on the silicone layer 40 via the second fabric layer 60; wherein, the base 50 is formed as an anti-slippery base made of silicone or rubber.

Figure 5:
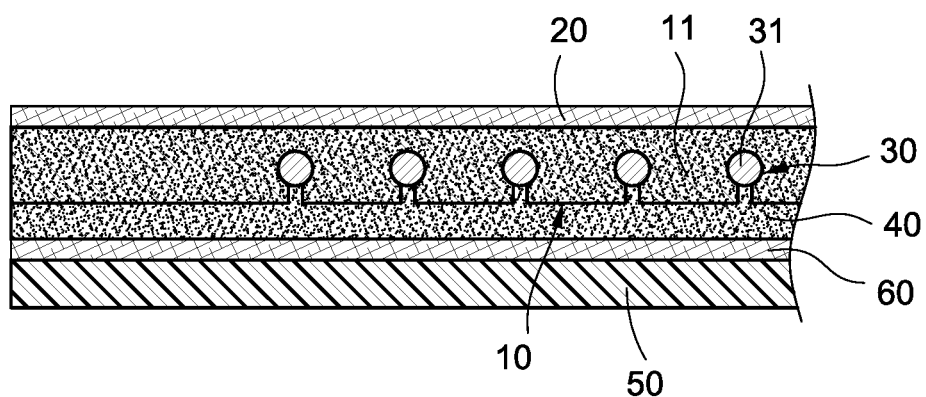
FIG. 5 is a cross sectional view showing the mouse pad structure having wireless charging coil according to one embodiment of the present invention.

Please refer to FIG. 5, which is a cross sectional view showing the mouse pad structure having wireless charging coil according to one embodiment of the present invention. The mouse pad structure having wireless charging coil 1 manufactured by the above-mentioned manufacturing procedure is as shown in figures, the first fabric layer 20, the covering layer 10, the coil layer 30 embedded in the covering layer 10, the silicone layer 40, the second fabric layer 60 and the base 50 are sequentially arranged from top to bottom; accordingly, the mouse pad structure having wireless charging coil 1 provided by the present invention is assembled.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A mouse pad structure having wireless charging coil, including:
    a covering layer, having a seat member and a plurality of accommodation slots formed on a lateral surface of the seat member;
    a first fabric layer, disposed on the seat member, and arranged on another lateral surface opposite to the accommodation slots;
    a coil layer, having a plurality of coils accommodated in the accommodation slots; and
    a silicone layer, filled in the accommodation slots and served to cover the coil.

2. The mouse pad structure having wireless charging coil according to claim 1, further including a base and a second fabric layer disposed on the base, and the base is disposed on the silicone layer via the second fabric layer.

3. The mouse pad structure having wireless charging coil according to claim 2, wherein the base is a rubber base.

4. The mouse pad structure having wireless charging coil according to claim 1, wherein the accommodation slots are formed in the seat member with an injection molding means.

5. The mouse pad structure having wireless charging coil according to claim 1, further including a connection module, the connection module has a circuit board electrically connected to the coil layer and a connector allowing the circuit board to be combined therein.

6. The mouse pad structure having wireless charging coil according to claim 1, wherein the first fabric layer is a multi-spandex fabric.

7. A manufacturing procedure of mouse pad structure having wireless charging coil, including:
    providing a covering layer, formed with a seat member with an injection molding means, wherein a plurality of accommodation slots is formed on a lateral surface of the seat member;
    providing a first fabric layer, disposed on the seat member, and arranged on another lateral surface opposite to the accommodation slots;
    providing a coil layer, including a plurality of coils accommodated in the accommodation slots; and
    providing a silicone layer, filled in the accommodation slots and served to cover the coils.

8. The manufacturing procedure of mouse pad structure having wireless charging coil according to claim 7, further including a base and a second fabric layer disposed on the base, and the base is disposed on the silicone layer via the second fabric layer.

9. The manufacturing procedure of mouse pad structure having wireless charging coil according to claim 7, wherein the silicone layer in a liquid status is filled in the accommodation slots then solidified for covering the coils.

* * * * *